United States Patent
Honma et al.

[11] Patent Number: 6,152,602
[45] Date of Patent: Nov. 28, 2000

[54] BALL SPLINE UNIT AND METHOD OF FORMING OUTER CYLINDER OF BALL SPLINE UNIT

[75] Inventors: Mitsuaki Honma; Tomozumi Murata, both of Tokyo, Japan

[73] Assignee: THK Co. Ltd., Tokyo, Japan

[21] Appl. No.: 09/230,541

[22] PCT Filed: May 30, 1997

[86] PCT No.: PCT/JP97/01853

§ 371 Date: Jan. 28, 1999

§ 102(e) Date: Jan. 28, 1999

[87] PCT Pub. No.: WO98/54474

PCT Pub. Date: Dec. 3, 1998

[51] Int. Cl.[7] .................................................. F16C 29/06
[52] U.S. Cl. ............................................................. 384/45
[58] Field of Search ................................. 384/45, 43, 44; 464/168

[56] References Cited

U.S. PATENT DOCUMENTS 4,128,279  12/1978  Ernst et al. .
5,755,516   5/1998  Teramachi et al. .
5,947,605   9/1999  Shirai ........................................ 384/45

FOREIGN PATENT DOCUMENTS

| 0 743 465 A1 | 11/1996 | European Pat. Off. . |
| 44-11482 | 5/1969 | Japan . |
| 55-97518 | 7/1980 | Japan . |
| 7-317762 | 12/1995 | Japan . |
| 8296641 | 11/1996 | Japan . |
| WO95/32366 | 11/1995 | WIPO . |

*Primary Examiner*—Lenard A. Footland
*Attorney, Agent, or Firm*—Armstrong, Westerman, Hattori, McLeland & Naughton

[57] ABSTRACT

An object of the present invention is to provide a ball spline unit enabling the balls to smoothly circulate without increasing a size of the ball spline unit, and enabling to be integrally molded by accurately setting a position of a resin portion to be formed to an outer cylinder. To achieve the object, the present invention is characterized in that at least one of the unloaded ball passage, retainer portions and ball direction changing passage inner peripheral portions is integrally molded with the outer cylinder in accordance with an insert molding method in which the outer cylinder is positioned within a molding die with reference to the loaded ball rolling grooves.

6 Claims, 9 Drawing Sheets

FIG. 1
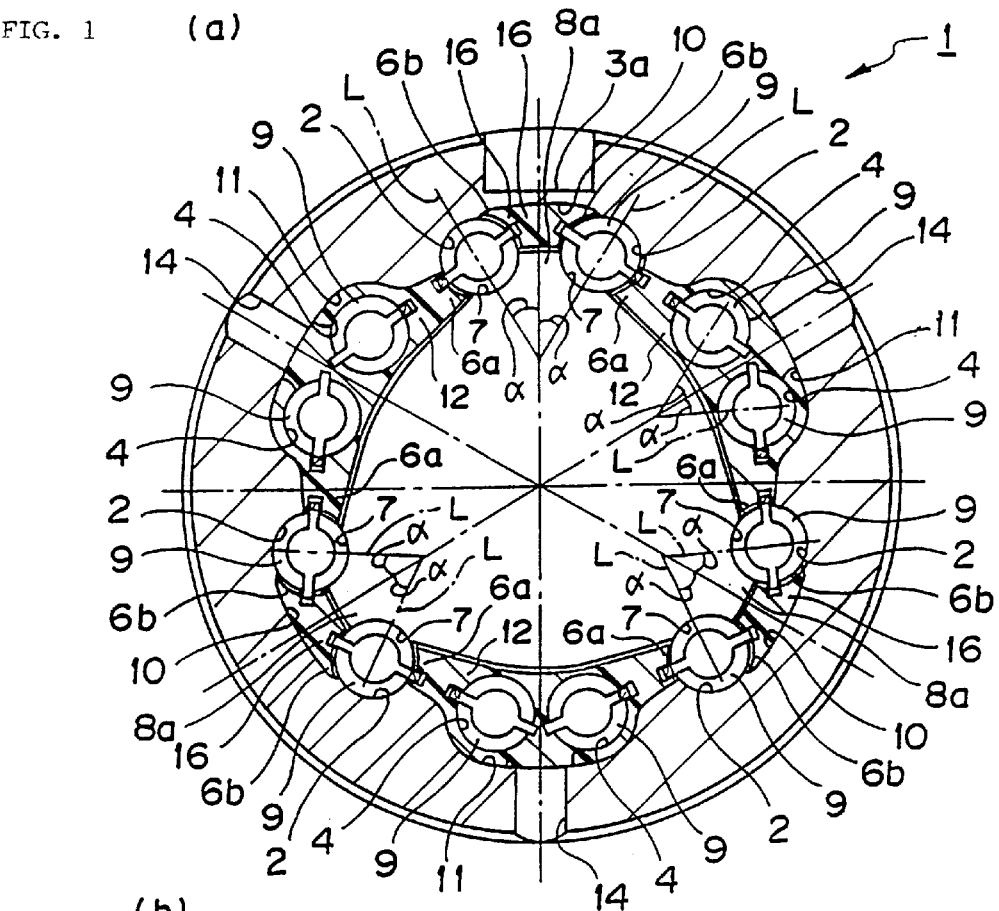
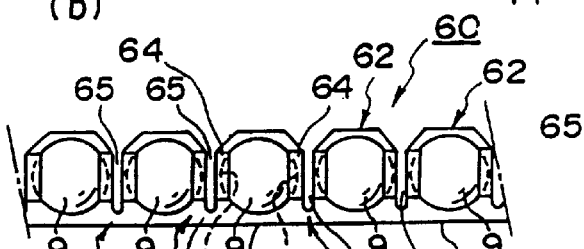
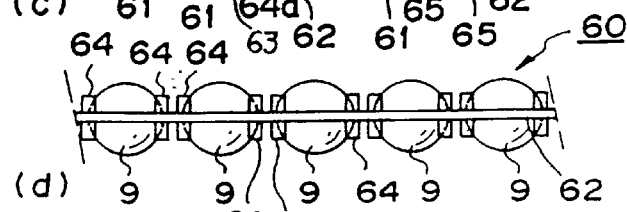
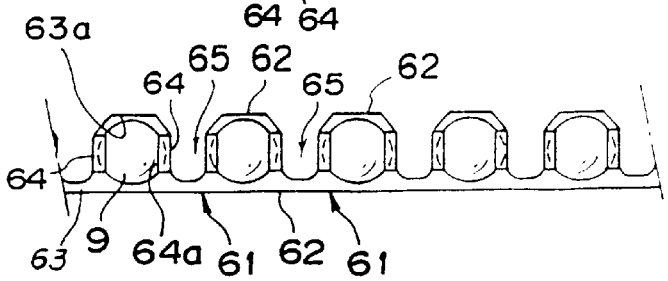
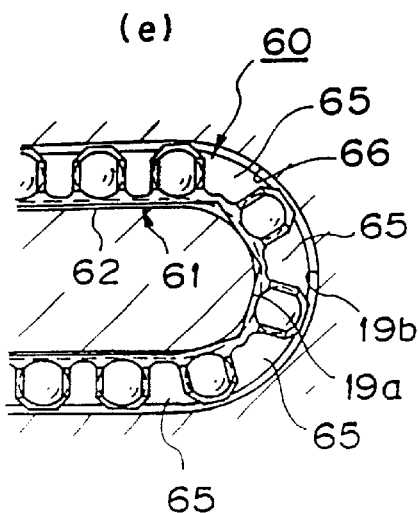

FIG. 2
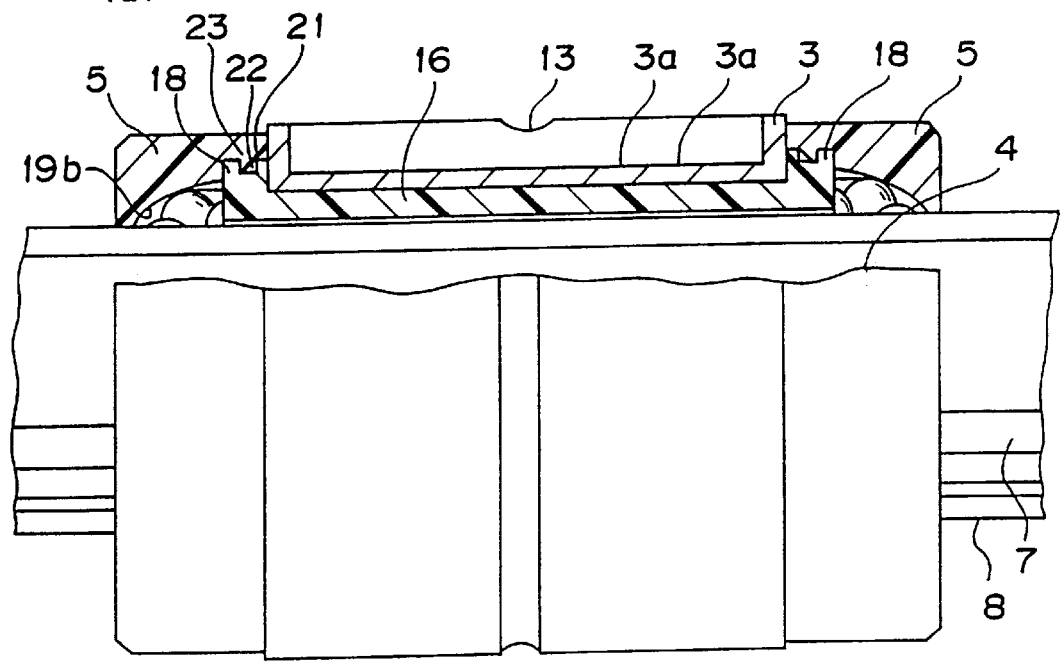
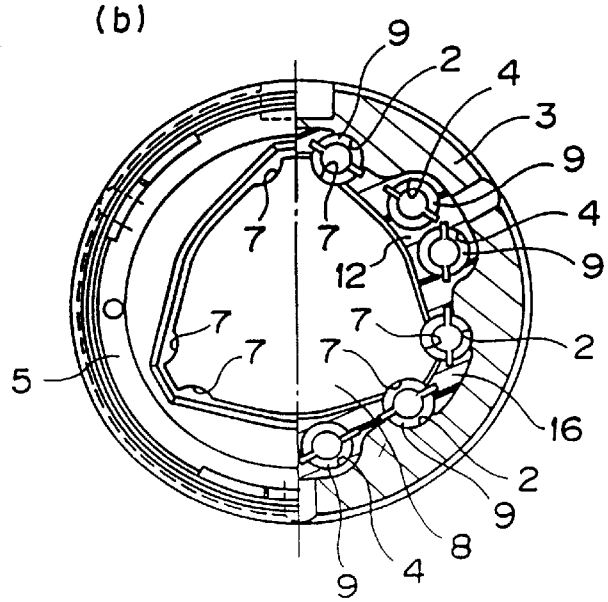

FIG. 4
(a)
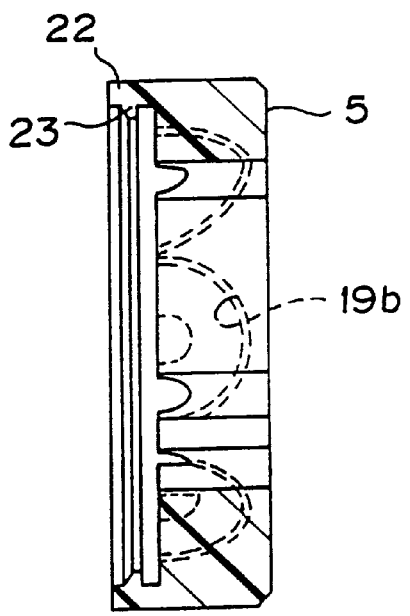
(b)
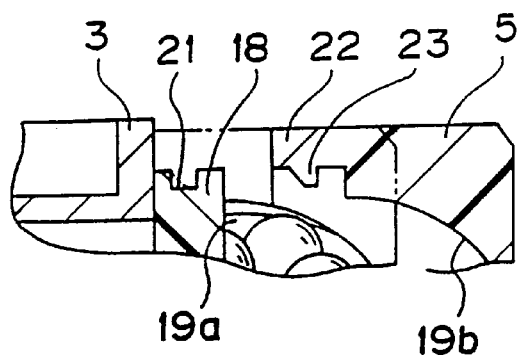
(c)
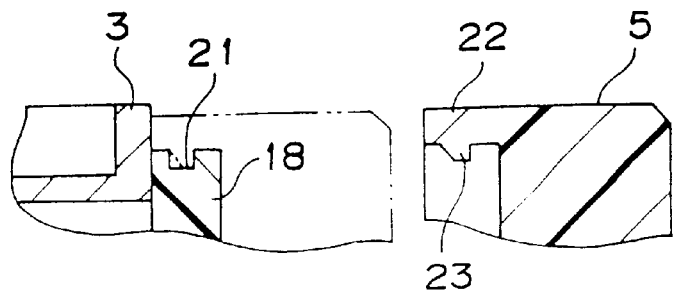

FIG. 5
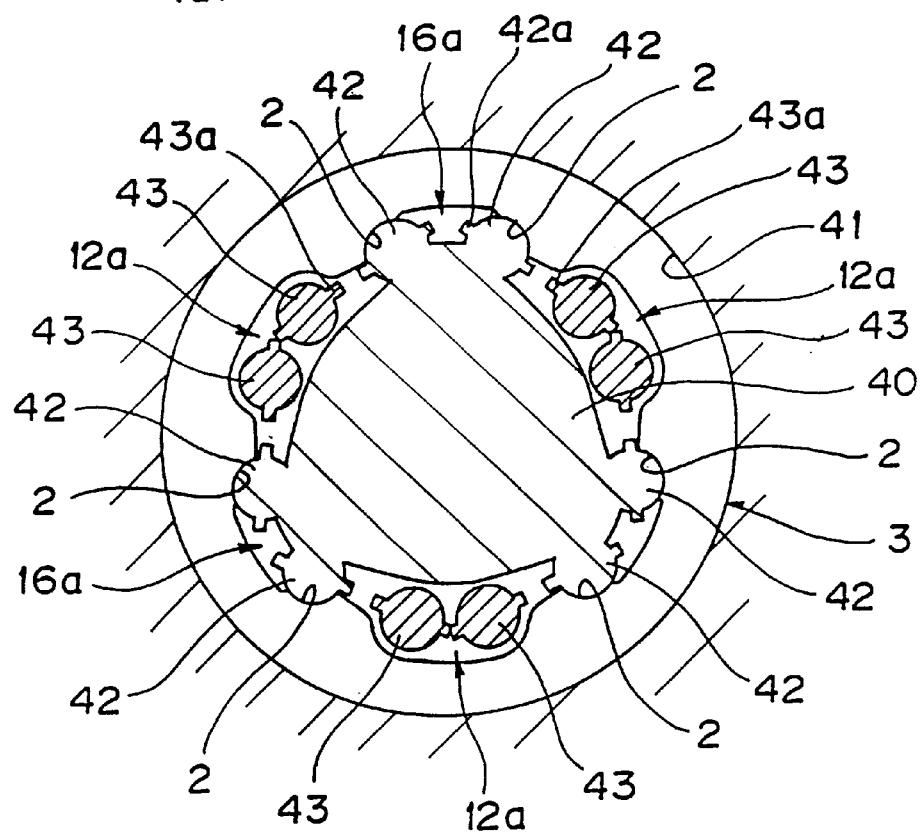
(a)
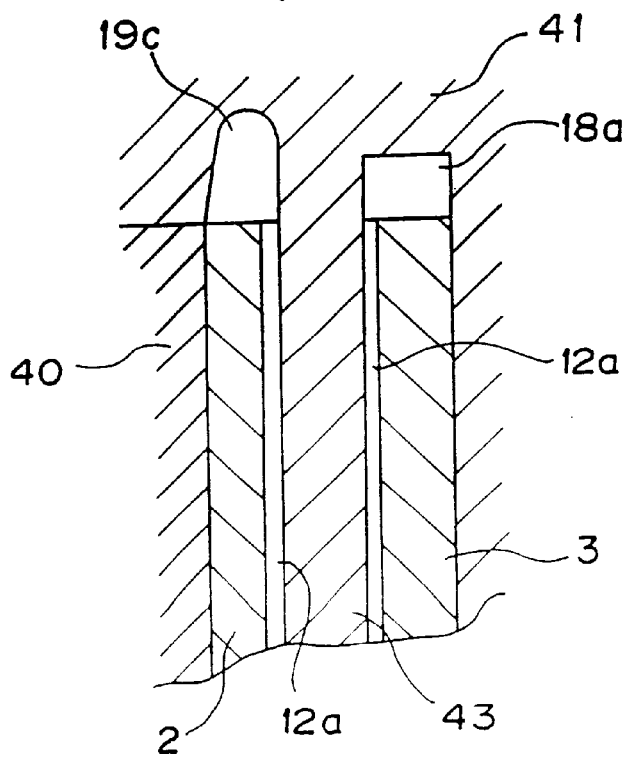
(b)

FIG. 9
(a)
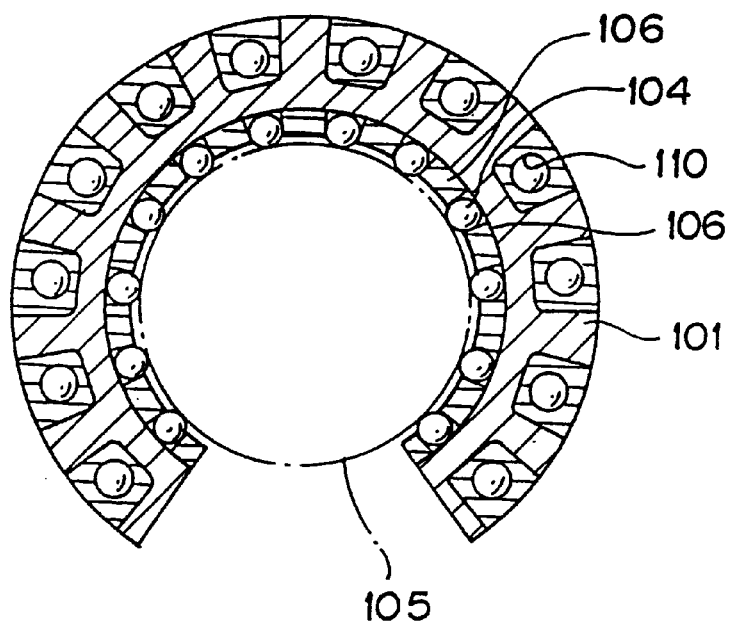
(b)
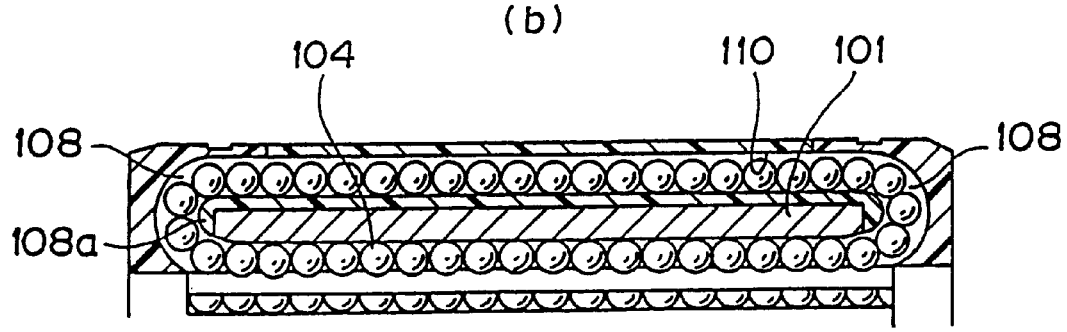
(c)
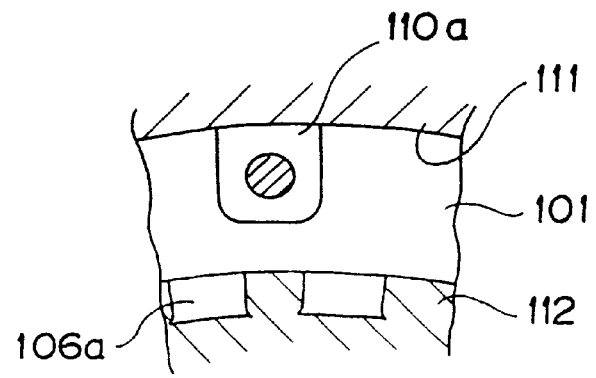

6,152,602

BALL SPLINE UNIT AND METHOD OF FORMING OUTER CYLINDER OF BALL SPLINE UNIT

TECHNICAL FIELD

The present invention relates to a ball spline unit in which balls are disposed between a spline shaft and an outer cylinder and relates to a method of molding the outer cylinder of the ball spline unit.

BACKGROUND ART

The conventional ball spline unit of this type has a structure comprising a cylindrical outer cylinder to which a plurality of loaded ball rolling grooves are formed at an inner periphery of the outer cylinder. This outer cylinder is provided with a plurality of unloaded ball passages corresponding to the loaded ball rolling grooves. Both ends portions of the outer cylinder are provided with side covers each having a direction changing passage for communicating the loaded ball rolling grooves with the unloaded ball passages. Further, in order to prevent balls disposed in the loaded ball rolling grooves from dropping off, retainer portions are provided with the inner periphery of the outer cylinder along the loaded ball rolling grooves.

A spline shaft is inserted into the outer cylinder so that the outer cylinder is reciprocally moved. At an outer periphery of the spline shaft, there are formed with loaded ball rolling grooves corresponding to the loaded ball rolling grooves formed to the outer cylinder, and a number of balls are disposed between the loaded ball rolling grooves.

However, in the conventional spline unit described above, since a radius of curvature of the direction changing passage is small, sticks of the ball are liable to occur. In order to prevent the sticking of the balls, it is effective to increase the radius of curvature of the direction changing passage. However, such structure will result in increase of a size of the spline unit.

On the other hand, it has been conventionally attempted to lower a noise level and manufacturing cost of the spline unit by forming ball supporting portions, side covers and the unloaded ball passages as resin molded members for which high rigidity is not required.

However, each of the conventional resin molded members was a separately molded member which is separately formed form the outer cylinder. Therefore, an assembling process for integrating the molded members was required after completion of molding the respective members.

In this regard, one may happen to think of integrally molding the ball supporting portions or the like with the outer cylinder for the purpose of reducing the assembling steps.

As an example of such integrally molding technique, for example, a method of forming a linear motion ball bearing shown in U.S. Pat. No. 4,128,279 is well known.

As shown in FIG. 9, the aforementioned linear motion ball bearing is constructed so as to comprise an outer cylinder 101 a part of which is cut out so as to have an opened sectional shape, and a shaft 105 to be inserted into the outer cylinder 101.

A number of balls 104 arranged in an axial direction are disposed between the inner circumference of the outer cylinder 101 and the outer circumference of the shaft 105, so that the outer cylinder 101 can linearly move along the shaft 105. The balls 104 are arranged in a circumferential direction of the outer cylinder 101 so as to form a plurality of ball rows. Each of the ball rows is arranged so as to circulate through the direction changing passages 108 formed to both ends of the outer cylinder 101 and through the plurality of unloaded ball passages 110 provided to the outer circumference of the outer cylinder 101. The balls 104 disposed in the loaded region between the outer cylinder 101 and the shaft 105 are retained by retainer portions 106 provided at both sides of the ball row so as to extend along the axial direction.

Further, afore-mentioned retainer portions 106, inner peripheral portion 108a of the direction changing passage 108 and the unloaded ball passages 110 were integrally molded with the outer cylinder 101 by using an insert-molding method.

However, in a case of the conventional linear motion ball bearing described above, when the insert molding is performed, as shown in FIG. 9(c), for example, the outer periphery of the outer cylinder 101 is tightly contact to a first molding die 111 while the inner periphery of the outer cylinder 101 is tightly contact to a second molding die 112 thereby to form cavities 106a and 110a for molding the retaining portions 106 and the unloaded ball passages 110. However, it was difficult for the inner and outer peripheries of the outer cylinder 101 to accurately and tightly contact to the first and second cavities 111 and 112, so that there was arisen a problem that a gap was liable to occur between the contacting surfaces, generating burrs.

In particular, when the burrs are generated between the contacting surfaces of the inner periphery of the outer cylinder 101 and the second molding die 112, thus resulting in generation of the burrs at loaded ball rolling surfaces, so that such burrs are required to be removed. However, it is very difficult and practically impossible to remove such burrs generated at inner portions between the retaining portions 106 and 106.

When such burrs exist, the circulation of the balls 104 is obstructed, so that a feeding accuracy is deteriorated. In the worst case, the balls 104 are jammed or clogged up to stop a machine using the spline unit, thus resulting in serious influence on productivity.

The present invention has been conceived for solving the afore-mentioned problems encountered in the prior arts, and an object of the present invention is to provide a ball spline unit enabling the balls to smoothly circulate without increasing the size of the ball spline unit.

Further, another object is to provide a method of molding an outer cylinder of the ball spline unit which is capable of being integrally molded by accurately setting positions of resin portions to be formed to the outer cylinder.

DISCLOSURE OF THE INVENTION

The present invention provides a ball spline unit comprising a cylindrical outer cylinder of which inner periphery is formed with a plurality of loaded ball rolling grooves, a plurality of unloaded ball passages corresponding to the ball rolling grooves formed to the outer cylinder, side covers each having a direction changing passage for connecting the loaded ball rolling grooves to the unloaded ball passages, the side covers being provided at both end portions of the outer cylinder, retainer portions provided along the the loaded ball rolling grooves so as to prevent balls in the loaded ball rolling grooves from dropping off, a spline shaft inserted into the outer cylinder, an outer periphery of the spline shaft being formed with loaded ball rolling grooves corresponding to the loaded ball rolling grooves formed to the outer cylinder, and a number of balls disposed between the outer cylinder and the loaded ball rolling grooves formed to the spline shaft so as to endlessly circulate through the direction changing passages and the unloaded ball passages, wherein a ball chain having a number of spacer portions disposed between the respective balls of the number of balls and having connecting portions for connecting the adjacent spacer portions is provided, and wherein at least one of the unloaded ball passage, retainer portions and ball direction changing passage inner peripheral portions is integrally molded with the outer cylinder in accordance with an insert molding method in which the outer cylinder is positioned within a molding die with reference to the loaded ball rolling grooves.

According to the structure described above, the balls in the direction changing passage are drawn by the ball chain and moved, so that the balls are smoothly moved even if the curvature radius of the direction changing passage is relatively small. Therefore, the balls can be smoothly circulated and moved without increasing the size of the outer cylinder.

Further, the balls would not collide to each other at the time of rolling and transferring, so that the noise generation can be reduced. In addition, the balls would not collide to also the inner peripheral surface of the unloaded ball passage, the noise generation can be further reduced.

On the other hand, at least one of the unloaded ball passage, ball retaining portions and ball direction changing passage inner peripheral portions are integrally molded by the insert molding with reference to the loaded ball rolling grooves formed to the inner periphery of the outer cylinder. Owing to this structure, the assembling process can be simplified and reduced.

In addition, there is no fear of causing irregularities due to the assembling error at joint portions to be formed between the ball direction changing passage and the loaded ball rolling grooves and between the direction changing passage and the unloaded ball rolling grooves, so that the circulation of the balls can be performed smoothly and the noise generation can be also reduced.

Furthermore, the outer cylinder is positioned in the molding die with reference to the loaded ball rolling grooves, so that it becomes possible to prevent the burrs from generating at a portion between the loaded ball rolling grooves and the molding die. Once the burrs are generated at the loaded ball rolling grooves, it is impossible to remove the burrs. In order to remove the burrs, the outer cylinder is obliged to be broken. Therefore, it is greatly important to prevent the generation of the burrs.

In addition, when grooves for accommodating the connected portions of the ball chain are formed in an entire circumference of the unloaded ball rolling grooves, the retainer portions and the ball direction changing passage, run-out of the ball chain can be prevented.

On the other hand, when the ball chain is constructed so that each of the balls can be retained by the respective spacer portion, an operation of assembling the balls into the outer cylinder can be completed by only inserting the ball chain retaining the balls in a form of continuous chain.

Further, even if the outer cylinder is drawn or detached from the spline shaft, the balls are retained by the ball chain, so that the retainer portions may be omitted.

The ball chain has a function of circulating the ball while providing a predetermined gap between the respective balls and is not always required to have a retentive function of preventing the balls from dropping off. In a case where the ball chain having no such retentive function is used, the balls are required to be retained when the outer cylinder is detached from the spline shaft, so that it is preferable to provide the retainer portion to the outer cylinder. However, if the outer cylinder is not required to retain the balls, it goes without saying that the retainer portion can be omitted.

In addition, in the structure described above, even in a state where a guide portion for guiding the ball chain is provided to the unloaded ball passage, the retainer portion and the ball direction changing passage, it is possible to use the spline unit by assembling only the balls without using the ball chain. Namely, this structure of the outer cylinder can be applied to both the following two cases, i.e., a case where the balls are assembled into the ball chain, then the ball chain is attached to the outer cylinder and a case where only the balls are attached to the outer cylinder without using the ball chain.

On the other hand, it is preferable that the inner periphery of the outer cylinder is formed with a plural set of loaded ball rolling groove sets in a circumferential direction, wherein each of the loaded ball rolling groove set consists of a pair of loaded ball rolling grooves adjacently arranged to each other, and the outer periphery of the spline shaft is formed with a plurality of corner portions positioned between the paired loaded ball rolling grooves which constitutes the loaded ball rolling groove set, and both side surfaces of the corner portions are provided with a pair of loaded ball rolling grooves corresponding to the paired loaded ball rolling grooves formed to the outer cylinder, while the inner periphery of the outer cylinder is formed with a plurality of unloaded ball passages corresponding to the respective loaded ball rolling grooves, wherein the unloaded ball passages are provided at portions between the plurality of the loaded ball rolling groove sets.

According to the structure described above, an outer diameter of the outer cylinder can be further reduced.

Furthermore, it is also preferable that the inner periphery of the outer cylinder is formed with a plural set of loaded ball rolling groove sets in a circumferential direction, in which of the loaded ball rolling groove set consists of a pair of loaded ball rolling grooves adjacently arranged to each other, and the outer periphery of the spline shaft is formed with a pair of loaded ball rolling grooves corresponding to the paired loaded ball rolling grooves formed to the outer cylinder, wherein the paired loaded ball rolling grooves formed to the spline shaft are formed at both side surfaces of a plurality of corner portions positioned between the paired loaded ball rolling grooves which constitutes the loaded ball rolling groove set, while the outer periphery of the outer cylinder is formed with a plurality of unloaded ball passages corresponding to the plurality of the loaded ball rolling groove.

In particular, the ball spline unit is characterized in that the unloaded ball passages to be formed to the outer periphery of the outer cylinder are arranged in a direction along a contact angle line connecting contact portions of the balls with respect to the respective loaded ball rolling grooves between which the balls are disposed.

According to this structure, a direction of the direction changing passage coincides with the rolling direction of the balls, so that the balls are smoothly rolled and moved.

A method of molding an outer cylinder according to the present invention is characterized by comprising the steps of:

providing a plural set of loaded ball rolling groove sets to an inner periphery of the outer cylinder in a circumferential direction, in which each of the loaded ball rolling groove sets consists of a pair of loaded ball rolling grooves arranged adjacently to each other;

disposing the outer cylinder to a portion between a first molding die and a second molding die arranged coaxially to each other, and providing a plurality of supporting convex portions for supporting the outer cylinder to an outer periphery of the first molding die which is positioned at inner peripheral side of the outer cylinder, the supporting convex portion engaging with the paired loaded ball rolling grooves of the respective loaded ball rolling groove sets formed to the outer cylinder; and positioning the outer cylinder to the portion between the first and second molding dies with reference to the loaded ball rolling grooves so that the outer cylinder is supported by the plurality of the supporting convex portions, forming at least one of cavities, for forming first resin portions constituting unloaded ball passages, for forming second resin portions constituting retainer portions and for forming ball direction changing passage inner peripheral portions, to portions between the first and second molding dies and the outer cylinder, then injecting molding material into the cavities thereby to integrally mold the respective portions with the outer cylinder.

According to the method described above, the supporting convex portion formed to the first molding die is supported so as to be clamped by the paired loaded ball rolling grooves of the respective loaded ball rolling groove set formed to the outer cylinder. Therefore, even if a molding pressure is applied to the outer cylinder, the outer cylinder can be supported without causing any backlash in a rotating direction or in a direction orthogonal to a center axis, so that the molding material would not invade into the ball rolling grooves, thus preventing the generation of burrs.

BRIEF DESCRIPTION OF THE DRAWINGS

FIG. 1(a) is a longitudinal sectional view showing a first embodiment of a ball spline unit according to the present invention, and FIGS. 1(b)–(e) are views showing structures of ball chain.

FIG. 2(a) is a front vie w partially in section of the ball spline unit shown in FIG. 1, and FIG. 2(b) is a side view, half in section, of the ball spline unit shown in FIG. 2(a).

FIG. 4(a) is a longitudinal sectional view of a side cover, FIG. 4(b) is a rear end view of the side cover, and FIG. 4(c) is a view showing a state where the outer cylinder and the side cover are engaged.

FIGS. 5(a), (b) are views showing one embodiment of a method of molding an outer cylinder according to the present invention.

FIG. 9 is a view showing a conventional linear motion bearing.

BEST MODE FOR EMBODYING THE INVENTION

Figure 3:
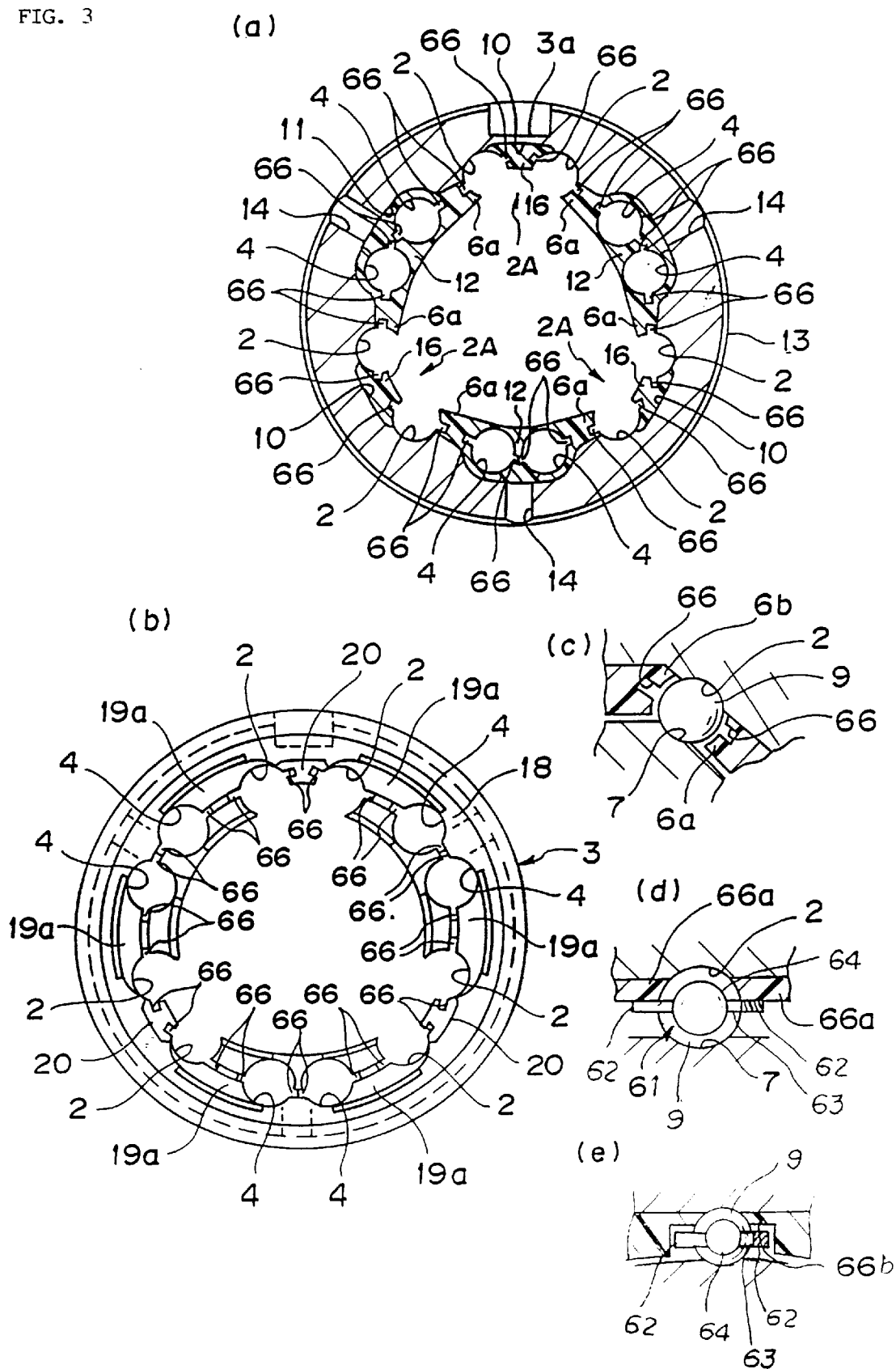
FIG. 3(a) is a cross sectional view showing an outer cylinder of the ball spline unit shown in FIG. 1.
FIG. 3(b) is a view showing an end surface of the outer cylinder, FIG. 3(c) i s a view partially i n section of a ball rolling groove in which ball chain is not used.
FIGS. 3(d) and 3(e) are partially sectional views of a ball rolling groove portions in which only a guide portion for preventing run-out of the ball chain is provided.

In order to explain the present invention in more detail, the preferred embodiments of this invention will be described hereunder with reference to the accompanying drawings.

[Embodiment 1]

FIGS. 1 and 2 show an embodiment 1 of a ball spline unit according to the present invention.

In general, the ball spline unit 1 is constituted by comprising a cylindrical outer cylinder 3, a pair of side covers 5 provided to both ends of the outer cylinder 3, and a spline shaft 8 interfitted into an inner periphery of the outer cylinder 3 through a number of balls 9 so that the outer cylinder is relatively slidable with respect to the spline shaft 8.

The outer cylinder 3 is a cylindrical body composed of metal having a high rigidity, and the inner periphery of the outer cylinder 3 is formed with a plurality of loaded ball rolling grooves 2. The loaded ball rolling grooves 2 are constructed as a plural set of loaded ball rolling groove sets 2A to be arranged in an circumferential direction, each of the loaded ball rolling groove sets 2A consisting of a pair of loaded ball rolling grooves 2, 2 arranged adjacently to each other. In this embodiment, three sets of loaded ball rolling groove sets 2A are provided at an equal interval in the circumferential direction.

On the other hand, the spline shaft 8 is inserted into the outer cylinder 3, and an outer periphery of the spline shaft 8 is provided with three corner portions 8a at positions between the paired loaded ball rolling grooves 2, 2 which constitute the respective loaded ball rolling groove sets 2A. Both side surfaces of the respective corner portions 8a are provided with a pair of loaded ball rolling grooves 7, 7 corresponding to the paired loaded ball rolling grooves 2, 2 formed to the outer cylinder 3. Further, six rows of balls 9 are disposed between the six sets of loaded ball rolling grooves 2 and 7 arranged so as to oppose to each other, and the balls of the respective rows are applied with a predetermined preload.

A contact angle line L connecting contact points of each loaded ball 9 contacting to the loaded ball rolling grooves 2 and 7 is inclined with a predetermined angle α with respect to a radial line connecting a center of the ball to a center of the spline shaft 8. The contact angle α is set so as to be linearly symmetric to each other with respect to a line connecting the center of the spline shaft 8 to the center of the corner portion 8a.

The six rows of balls 9 disposed between the respective loaded ball rolling grooves 2 and 7 are circulated and moved in such a manner that the balls 9 are moved from one end of the loaded ball rolling groove 2, then moved into the unloaded ball passage 4, which is formed in parallel with the loaded ball rolling groove 2, through a direction changing passage 19 formed to one side cover 5, then the balls 9 are moved through a direction changing passage 19 formed to the other side cover 5, subsequently transferred again to the loaded ball rolling grooves 2 and 7. The balls 9 are arranged over an entire circumference of a circulation passage consisting of a passage formed between the loaded ball rolling grooves 2 and 7, the direction changing passages 19 and the unloaded ball passage 4. The balls 9 are retained by a ball chain 60.

The ball chain 60 comprises spacer portions 61 disposed between the respective balls 9 and connecting portions 62 for connecting the adjacent spacer portions 61. Both ends of the ball chain 60 are not connected, and the ball chain 60 is attached in a state where a part of chain is cut off. In this regard, however, the ball chain 60 can be also formed in an endless shape by connecting both the end portions.

The spacer portion 61 comprises a flexible spacer plate 63 provided with a U-shaped structure having one side formed with a slit 65 and a pair of retention pieces 64 to which the adjacent balls 9 are seated respectively. The retention piece 64 is provided to right and left leg portions of the U-shaped spacer plate 63, and each of the retention pieces 64 comprises a spherical crown-shaped concave portion 64a thereby to realize a structure enabling the balls 9 to be retained.

On the other hand, the connecting portion 62 is constituted by a belt-shaped member for connecting both sides of the spacer portion 61. However, the connecting portion 62 may have a structure in which only one side of the respective spacer portion 61 is connected.

The ball chain 60 can be flexibly bent at a portion of the slit 65 formed to the spacer portion 61. A bending direction of the ball chain 60 in the direction changing passage 19 is as follows. Namely, the ball chain 60 has a structure so that the ball chain 60 circulates by being bent in a direction so as to open the slit 65 while a bottom side of the U-shaped spacer plate 63 directs inward. As shown in FIGS. 1(b) and (d), a width of the slit 65 can be appropriately selected in accordance with the curvature radius or the like of the direction changing passage 19.

When the balls 9 are retained by the ball chain 60 as described above, the balls 9 in the direction changing passage 19 are drawn by the ball chain 60 and moved, so that the balls 9 are smoothly moved even if the curvature radius of the direction changing passage 19 is relatively small. Therefore, the balls 9 can be smoothly circulated and moved without increasing the size of the spline unit.

Particularly, in this embodiment, the respective spacer portions 61 is constituted by being provided with the slit 65 so as to be easily opened, the curvature radius of the direction changing passage 19 can be further decreased.

As shown in FIG. 3(a), the loaded ball rolling grooves 2, 2 constituting the respective loaded ball rolling groove set 2A formed to the outer cylinder 3 are provided to both end portions of a first U-shaped groove 10 having a U-shape in cross section. However, the groove 10 is not limited to the U-shaped groove, and may be also constituted by a circular-arc-shaped groove.

In addition, a second U-shaped groove 11 to which the unloaded ball passage 4 is formed is provided to a portion between the aforementioned first U-shaped grooves 10 formed to the inner periphery of the outer cylinder 3. A first resin portion 12 extending in an entire longitudinal direction of the outer cylinder 3 is integrally interfitted into the second U-shaped groove 11. The first resin portion 12 has a circular-arc shape in section having a sufficient thickness, and a portion of the first resin portion 12 ranging from an outer end portion to a half thereof in a thickness direction is integrally interfitted into the second U-shaped groove 11, while an inner end portion of the first resin portion 12 is inwardly projected from the inner periphery of the outer cylinder 3.

Furthermore, the first resin portion 12 is formed with an unloaded ball passage 4. The unloaded ball passage 4 is constituted by a circular through hole having a diameter slightly larger than that of the ball 9 and is formed so that a center position of the passage 4 coincides with an inner diameter line of the outer cylinder 3.

In addition, side peripheries 6a in a circumferential direction of an inner end portion of the first resin portion 12 is projected toward a side of the adjacent first U-shaped groove 10.

The outer circumference of the outer cylinder 3 is provided, at center portion thereof, with a lubricant guide groove 13 extending over an entire circumference of the outer cylinder 3 so as to supply the lubricant. The lubricant guide groove 13 is communicated with the second U-shaped groove 11 of the inner peripheral side through a first communication hole 14. In addition, the first resin portion 12 is provided with a second communication hole 15 for communicating the aforementioned first communication hole 14 with the respective unloaded ball passage 4. Further, the outer periphery of the outer cylinder 3 is provided with a key groove 3a extending in an axial direction.

The aforementioned first U-shaped groove 10 is provided with a second resin portion 16 for retaining the ball 9. A side periphery in a circumferential direction of the second resin portion 16 and a side periphery in a circumferential direction of the first resin portion 12 are opposed to each other with a distance smaller than the diameter of the ball 9 thereby to constitute the retainer portions 6a and 6b for preventing the ball 9 from dropping-off.

As shown in FIG. 3(b), the first resin portion 12 and the second resin portion 16 are integrally connected at a ring-shaped third resin portion 18 which is bonded to both end surfaces of the outer cylinder 3. An end portion of the linearly extending loaded ball rolling groove 2 and an end portion of the unloaded ball passage 4 are opened to the end surface of the third resin portion 18, and circular-arc-shaped direction changing passage inner peripheral portions 19a are provided between the loaded ball rolling groove 2 and the unloaded ball passage 4.

On the other hand, as shown in FIG. 4, the side cover 5 to be attached to the end surfaces of the outer cylinder 3 is a ring-shaped member, and has a ring-shaped end surface which abuts against the ring-shaped end surface of the third resin portion 18. This end surface is formed with a circular-arc groove as concavity for constituting a direction changing outer periphery portion 19b so as to correspond to the direction changing passage inner peripheral portions 19a formed to six portions of the end surface of the third resin portion 18.

In addition, the outer peripheral portion of the side cover 5 is provided with a ring-shaped wall 22 which engages with an outer peripheral surface of the third resin portion 18 formed to a side of the outer cylinder 3. The inner periphery of the ring-shaped wall 22 is provided with an engaging projection 23 which engages with an engaging groove 21 formed to the outer periphery of the third resin portion 18. An end surface of the ring-shaped wall 22 abuts against an end surface of the outer cylinder 5.

The aforementioned unloaded ball passage 4, the retainer portions 6a and 6b, and the inner periphery portion 19a and the outer periphery portion 19b of the ball direction changing passage 19 are provided with guide grooves 66 as guide portions for guiding the ball chain 60. The guide grooves 66 are formed over an entire circumference so that one side peripheries of the connecting portion 62 and the retainer plate 63 of the ball chain 60 are accommodated into the guide grooves 66, thereby to prevent the run-out of the ball chain 60 during the rolling of the balls.

That is, the guide grooves 66 are linearly formed to the inner peripheral surface of the unloaded ball passage 4 of the first resin portion 12, side peripheral portions 12a, 16a opposing to each other in a circumferential direction of the first resin portion 12 and the second resin portion 16 constituting the retainer portions. In addition, a circular-arc-shaped guide grooves 66 are formed to the direction changing inner peripheral portion 19a and the direction changing outer peripheral portion 19b to be formed to the side cover 5.

By the way, even if the outer cylinder 3 is detached from the spline shaft 8, the balls are retained by the ball chain 60, so that the aforementioned retainer portions 6a, 6b are not always necessary. However, when the retainer portions 6a, 6b are provided, as shown in FIG. 3(c), the outer cylinder 3 can cope with a case where only the balls 9 are attached to the outer cylinder 3 without using the ball chain 60. Namely, one outer cylinder 3 can be commonly applied to both the following two specifications, i.e., a specification of a type using ball chain and a specification of a type using only the balls, thus being advantageous.

In particular, in a case where only the balls are provided, the guide grooves 66 for the ball chain 60 can be utilized as lubricant supplying groove for supplying lubricants such as grease or the like.

In addition, even in a case where the retainer portions 6a, 6b are omitted, it is preferable to provide a guide portion for the ball chain for the purpose of preventing the run-out of the ball chain 60. In this case, for example, as shown in FIG. 3(d), the aforementioned guide portion can be constituted by a guide wall 66a for guiding one side surfaces of the connecting portion 62 and the spacer portion 63 of the ball chain 60. Further, as shown in FIG. 3(e), the guide portion can be also constituted by a guide wall 66b having a stepped-shape.

All of the first resin portion 12 for constituting the unloaded ball passage, the first and second resin portions 12, 17 for constituting the retainer portions 6, and the third resin portion 18 for constituting the rolling member direction changing passage inner peripheral portion 19a is integrally molded with the outer cylinder 3 in accordance with the insert molding method in which the outer cylinder 3 is disposed in the molding die.

FIG. 5 is a view showing an interfitting state of the outer cylinder 3 and the molding die at the time of the insert molding.

The insert molding of the outer cylinder 3 is carried out in accordance with the following steps. Namely, the outer cylinder 3 is disposed between a first molding die 40 and a second molding die 41 that are coaxially arranged to each other with reference to the loaded ball rolling grooves 2 thereby to form a cavity 12a for forming the first resin portion 12 for constituting the unloaded ball passage 4, a cavity 16a for forming the second resin portion 16 for constituting the retainer portions, a cavity 19c for forming the ball direction changing passage inner peripheral portions 19a, and a cavity 18a for forming the third resin portion 18. Then, a resin material is injected into the respective cavities 12a, 16a, 18a and 19c thereby to form the first resin portion 12, the second resin portion 16, the third resin portion 18 and the direction changing passage inner peripheral portion 19a.

That is, the first molding die 40 is provided with a supporting convex portion 42 for supporting the outer cylinder 3 by engaging with the respective loaded ball rolling grooves 2 formed to the outer cylinder 3. The supporting convex portion 42 has a circular arc-shape in section corresponding to the circular arc-shape in section of the inner peripheral shape of the loaded ball rolling grooves 2, and tightly interfits into the loaded ball rolling grooves 2. Further, A core member 43 for forming the unloaded ball passage 4 is inserted into the cavity 12a for forming the first resin portion, the cavity 12a being formed between the first molding die 40 and the second molding die 41.

Furthermore, the supporting convex portion 42 and the core member 43 are formed with convex projections 42a and 43a corresponding to the guide grooves 66 for accommodating the side peripheries of the connecting portions 62 and the retainer plates 63 of the ball chain 60, whereby the guide grooves 66 are also integrally molded.

As described above, the outer cylinder 3 is positioned between the first and second molding dies 40 and 41 with reference to the loaded ball rolling grooves 2, so that the generation of burrs can be prevented at a portion between the loaded ball rolling grooves 2 and the first molding die 40. In particular, in this embodiment, the ball rolling groove sets are basically provided at three portions, and the outer cylinder 3 is positioned by the first molding die 40 at three points. In addition, there is provided an angular-contact structure, so that the positioning in a rotational direction can be also carried out, and the outer cylinder 3 can be accurately positioned with respect to the first molding die 40.

In addition, when a grinding work of the outer periphery of the outer cylinder 3 to be insert-molded is performed with reference to the loaded ball rolling grooves 2, a gap between the contact surfaces of the second molding die 41 and the outer periphery of the outer cylinder 3 inserted into the molding die can be set as small as possible, so that it becomes possible to prevent also the generation of burrs at outer circumferential side.

By the way, in order to prevent the generation of burrs, it is not always necessary for the contacting surfaces of the outer cylinder 3 and the supporting convex portion 42 of the molding die 40 to completely and tightly contact to each other. The gap may be allowed as far as the a size of the gap is sufficiently small to prevent the molding material from invading into the molding die.

As in the present invention, when the outer periphery of the outer cylinder 3 is finished by the grinding work and the outer cylinder 3 is disposed within the molding die with reference to the loaded ball rolling grooves 2, a gap of the outer periphery can be set to a predetermined small size capable of preventing the molding material from invading thereinto.

In addition, not only the gap of the outer periphery of the outer cylinder 3 but also a gap between the loaded ball rolling grooves 2 of the inner periphery side and the first molding die 40 can be set to a predetermined small size capable of preventing the molding material from invading thereinto. Furthermore, also the loaded ball rolling grooves 2 is finished by grinding work, so that the molding die and the loaded ball rolling grooves 2 will contact to each other with a gap having a small extent.

As described above, when the small gaps are provided to portions between the outer and inner peripheries of the first and second molding dies 40, 41 and the outer cylinder 3, it becomes possible to easily attach the outer cylinder 3 and to effectively prevent the generation of the burrs.

As described above, since all of the unloaded ball passage 4, ball retaining portions 6 and the direction changing passage inner peripheral portions 19a are integrally molded by the insert molding method with reference to the loaded ball rolling grooves 2 formed to the inner periphery of the outer cylinder 3, the assembling process can be remarkably simplified and reduced.

In addition, there is no fear of causing irregularities due to the assembling error at joint portions to be formed between the direction changing passage 19 and the loaded ball rolling grooves 6 and between the direction changing passage 19 and the unloaded ball rolling grooves 4, so that the circulation of the balls can be performed smoothly and the noise generation can be also reduced.

In this embodiment, although all of the unloaded ball passage 4, ball retainer portions 6 and the direction changing passage inner peripheral portions 19a are integrally molded with the outer cylinder by the insert molding method, at least one of those members may also be formed by the insert molding method.

Figure 6:
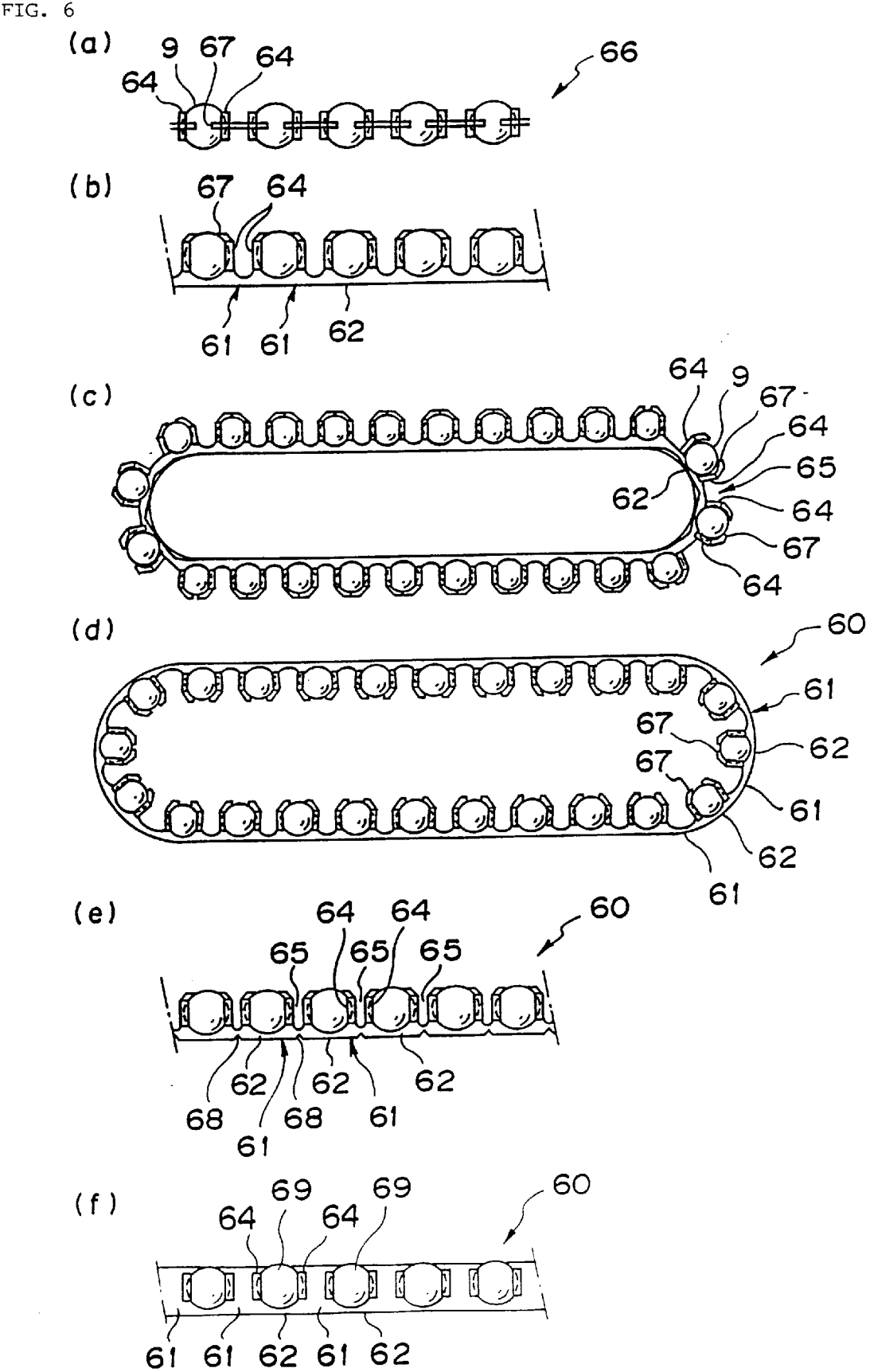
FIGS. 6(a)–(f) are views showing modifications of the ball chain shown in FIG. 1.

FIG. 6 are views showing modifications of the ball chains to be used in the above embodiments.

FIGS. 6(a) and 6(b) show a ball chain in which, among the connecting portions 62 provided both sides of the spacer portions 61, slits 62 are provided to the connecting portions 62 of the same side as the slit of the spacer portions 62. According to the structure described above, as shown in FIG. 6(c), the slit 67 of the connecting portion 62 together with the slit 65 of the spacer portion 61 are opened in the direction changing passage, so that the curvature radius of the direction changing passage can be further reduced.

Of course, as shown in FIG. 6(d), it is also possible to arrange the slits 65, 67 so that sides of the slits are located at inside of the direction changing passage.

FIG. 6(e) shows an example in which cut-outs 68 are formed to a side periphery opposed to the slit 65 of the spacer portion 61 of the ball chain 60 to be more easily deformable.

FIG. 6(f) shows an example in which slits 69 are formed to one side connecting portions 62 among the connecting portions 62 provided at both sides of the ball for connecting the adjacent spacer portions 61 without forming slits 65 to the spacer portions 61 to be more fittably bent.

Next, other embodiments of the present invention will be explained hereunder.

In the explanation of the respective embodiments, the reference numerals are used to denote the same elements or members as those of the first embodiment (Embodiment 1), and the detailed explanations of the same elements or members are omitted.

[Embodiment 2]

Figure 7:
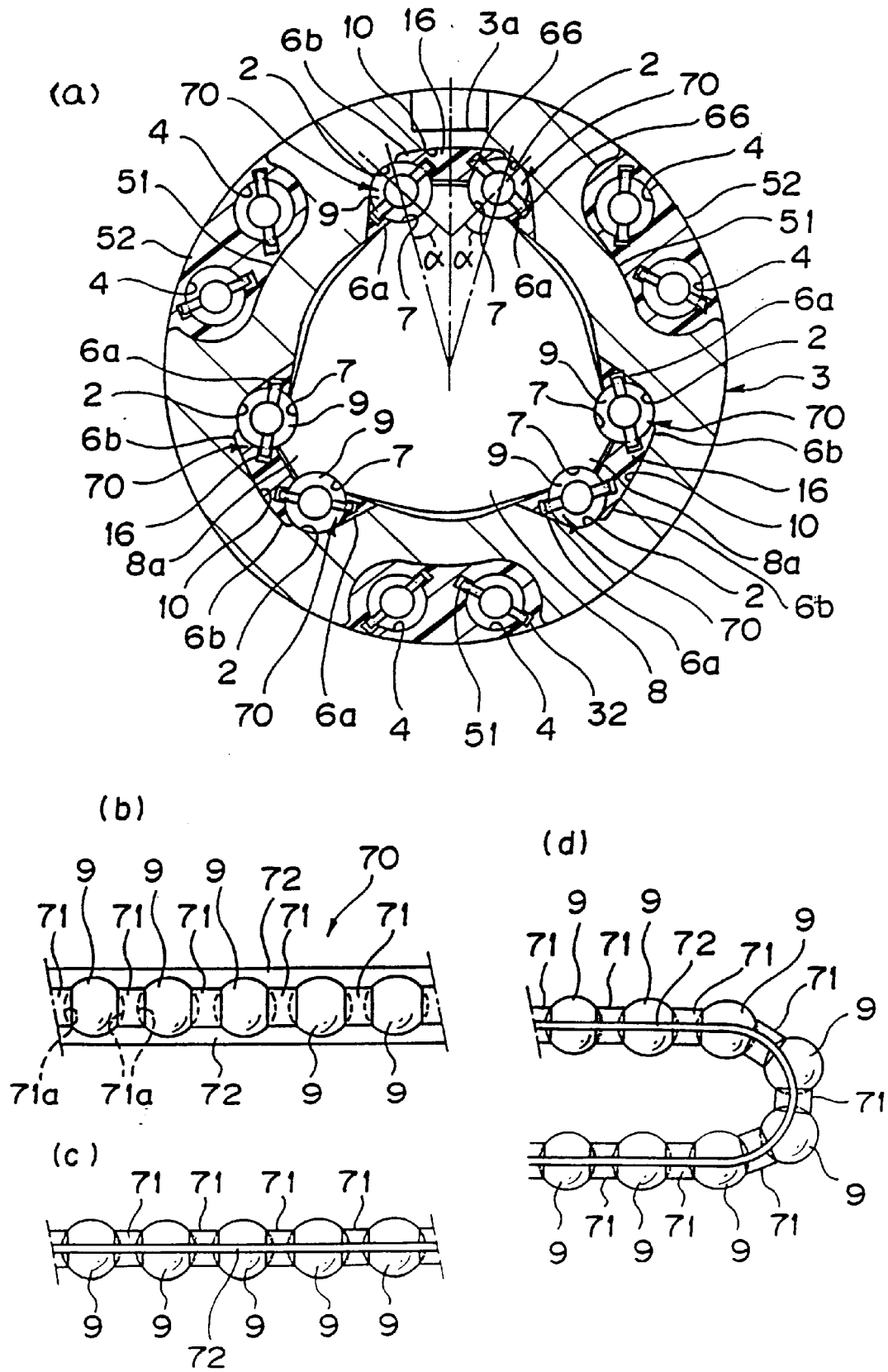
FIG. 7(a) is a longitudinal sectional view showing a second embodiment of a ball spline unit according to the present invention.
FIGS. 7(b)–(d) are views showing structures of ball chain.

FIG. 7 shows a second embodiment of the present invention. This embodiment 2 is an example in which the loaded ball passages are formed to the outer periphery of the outer cylinder.

This embodiment 2 is different from the embodiment 1 in a point that the loaded ball passages 4 are formed to the outer peripheral side of the outer cylinder 3. Namely, the second U-shaped grooves 51 are formed to the outer peripheral side of the outer cylinder 3, and the unloaded ball passages 4 are formed to the second resin portions 51 integrally molded so as to fill the second resin portions 52.

In this case, the ball chain is constituted by comprising retainer pieces 71, 71 as a pair of spacer portions disposed between the balls 9 and belt-shaped connecting portions 72 for connecting both sides of the respective retainer pieces 71, in which the belt-shaped connecting portion 72 is formed in a belt shape as a whole. In the direction changing passage 19, the ball chain changes its moving direction by bending a surface including both the sides of the belt-shaped connecting portions 72.

In this embodiment, slits are not provided to the retainer piece 71 as the spacer portion. According to this structure, the ball chain can be more stably guided in comparison with the ball chain 60 of the embodiment 1 provided with slits 65. In the embodiment 1, the unloaded ball passages are formed to the inner periphery of the outer cylinder, so that a difference in a length between the outer and inner circumferential lengths of a circulation track is increased. Therefore, in order to realize the smooth direction changing, the slit 65 is formed at outer side portion of the paired retainer pieces 64.

In particular, in a case where the spline shaft 8 is rotated with a high speed, a centrifugal force to be applied to the ball increases. In the case of the embodiment 1, however, a circulating direction of the ball chain 60 is orthogonal to a direction to which the centrifugal force is applied, so that a friction force caused between the ball chain and the guide groove is disadvantageously increased when the ball chain 60 is deformed by the centrifugal force. As a result, there may be a fear that the smooth circulation of the ball chain will be obstructed.

In contrast, according to this embodiment 2, both sides of the ball are connected by the belt-shaped connecting portion 72, the circulating direction of the ball chain 70 is close to the direction to which the centrifugal force is applied in comparison with that of the embodiment 1, so that the deformation of the ball chain 70 occurs along the circulating direction of the ball chain 70. As a result, an influence of the centrifugal force can be lowered.

[Embodiment 3]

Figure 8:
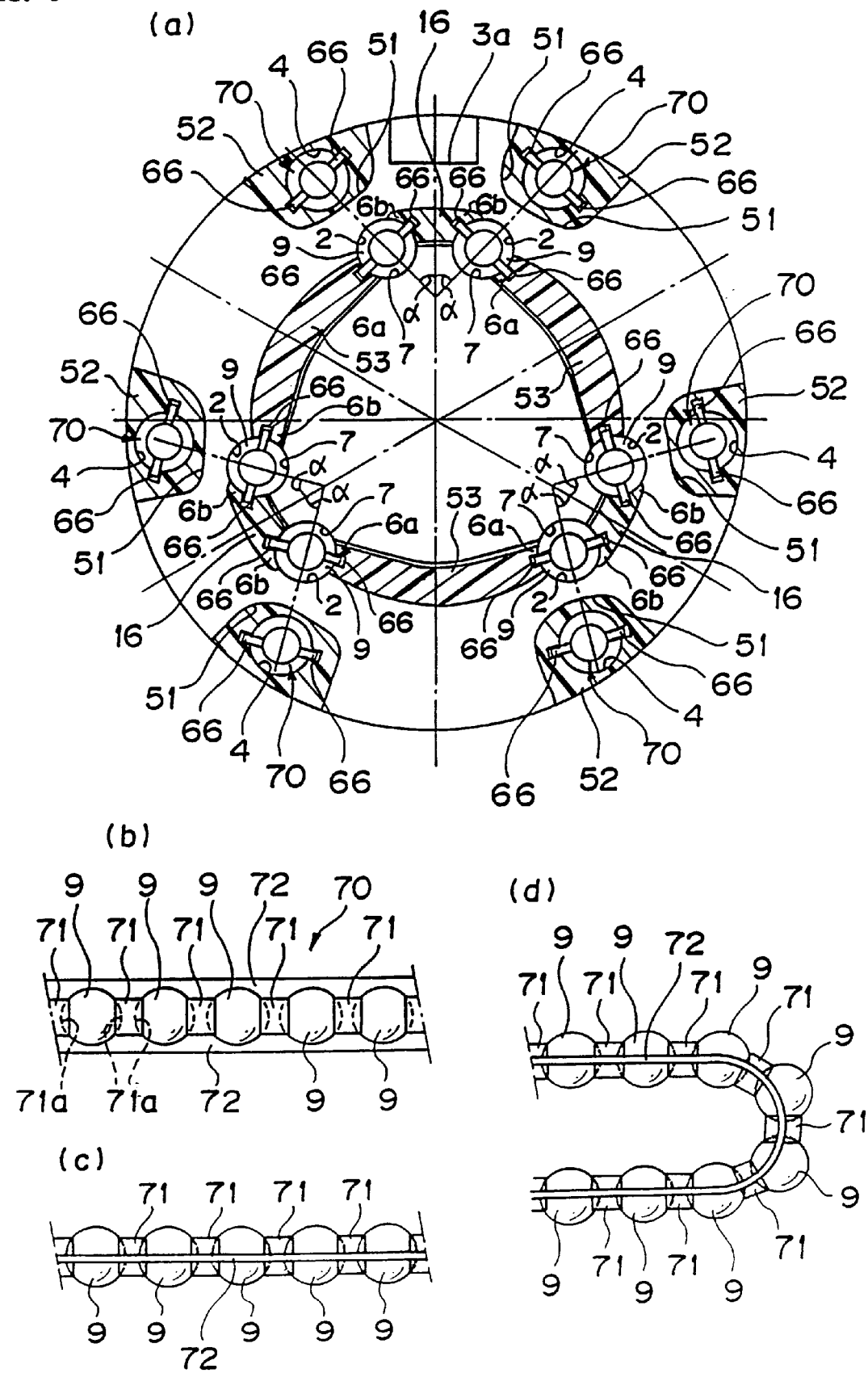
FIG. 8(a) is a sectional view showing a third embodiment of a ball spline unit according to the present invention.
FIGS. 8(b)–(d) are views showing structures of ball chain.

FIG. 8 shows a third embodiment of the present invention.

This embodiment 3 of a ball spline unit is formed by providing the unloaded ball passages 4 to the outer peripheral side of the outer cylinder 3 in the same manner as in the embodiment 2. In particular, the ball spline unit has a structure of that the unloaded ball passages 4 to be formed to the outer periphery of the outer cylinder 3 are arranged in a direction along a contact angle line L connecting contact portions of the balls 9 with respect to the respective loaded ball rolling grooves 2 and 7 between which the balls 9 are disposed.

According to this structure, a direction of the direction changing passage 19 coincides with the rolling direction of the balls, so that the balls 9 are smoothly rolled and moved.

The outer periphery of the outer cylinder 3 is formed with a second U-shaped grooves 51, and the unloaded ball passages 4 are formed to the second resin portions 51 integrally molded so as to fill the second U-shaped grooves 52. As described above, since the unloaded ball passages 4 are formed to the outer peripheral side of the outer cylinder 3, the concave portions as formed in the embodiment 1 are not formed at portions of inner periphery of the outer cylinder 3 to which the first resin portions 12 are provided. As a result, the first resin portions 12 are molded in a form of circular-arc-shape having a uniform thickness.

In addition, in the same manner as in the embodiment 2, the ball chain 70 is constituted by comprising retainer pieces 71, 71 as spacer portions disposed between the balls 9 and connecting portions 72 for connecting both sides of the respective retainer pieces 71, in which each of the connecting portions 72 is formed in a belt shape as a whole. In the direction changing passage 19, the ball chain 70 changes its moving direction by bending a surface including the both sides of the belt-shaped connecting portions 72.

In this embodiment 3, the circulating direction of the ball chain 70 is further close to the direction to which the centrifugal force is applied in comparison with that of the embodiment 2, so that an influence of the centrifugal force can be further lowered than that of the embodiment 2, whereby the ball chain can be smoothly circulated.

According to the present invention as described above, since a number of balls are retained by the ball chain, the ball chain is smoothly moved even if the curvature radius of the direction changing passage is relatively small. Therefore, the balls can be smoothly circulated and moved without increasing an outer diameter of the outer cylinder.

Further, the balls would not collide with each other at the time of rolling and transferring and would also not collide with the inner peripheral surface of the unloaded ball passage, so that the noise generation can be reduced thereby to improve a low-noise property.

In addition, since at least one of the unloaded ball passage, ball retaining portions and ball direction changing passage inner peripheral portions are integrally molded by the insert molding with reference to the loaded ball rolling grooves formed to the inner periphery of the outer cylinder, the assembling process can be simplified and reduced. At the same time, there is no fear of causing irregularities due to the assembling error at joint portions to be formed between the ball direction changing passage and the loaded ball rolling grooves and between the direction changing passage and the unloaded ball rolling grooves, so that the circulation of the balls can be performed smoothly and it becomes possible for the balls to smoothly circulated and moved in co-operation with the guiding function of the ball chain.

Furthermore, since the outer cylinder is positioned in the molding die with reference to the loaded ball rolling grooves and molded, it becomes possible to prevent the burrs from generating at a portion between the loaded ball rolling grooves and the molding die.

In addition, when grooves for accommodating the connected portions of the ball chain are formed in an entire circumference of the unloaded ball rolling grooves, the retainer portions and the ball direction changing passage, run-out of the ball chain can be prevented.

Furthermore, when the ball chain has a function of retaining the balls, an operation of assembling the balls into the outer cylinder can be completed by only inserting the ball chain retaining a number of balls in a form of continuous chain.

On the other hand, when the inner periphery of the outer cylinder at portions between the plurality of the loaded ball rolling groove sets is formed with a plurality of unloaded ball passages corresponding to the respective loaded ball rolling grooves, it becomes possible to further reduce an outer diameter of the outer cylinder.

In addition, when the outer peripheral portion of the outer cylinder is formed with a plurality of unloaded ball passages corresponding to the respective loaded ball rolling grooves, and the unloaded ball passages are arranged along a contacting direction of the balls, a direction of the direction changing passage coincides with the rolling direction of the balls, so that the balls are smoothly rolled and moved.

Furthermore, according to the method of molding the outer cylinder of the present invention, the supporting convex portion formed to the first molding die is supported so as to be clamped by the paired loaded ball rolling grooves of the respective loaded ball rolling groove set by utilizing the ball contacting structure of the outer cylinder, so that even if a molding pressure is applied to the outer cylinder, the outer cylinder can be supported without causing any backlash in a rotating direction or in a direction orthogonal to a center axis. As a result, the molding material would not invade into the ball rolling grooves, thus securely preventing the generation of burrs.

INDUSTRIAL APPLICABILITY

The present invention can be widely applicable to ball spline units each comprising an outer cylinder and a circulation passages formed to the outer cylinder for endlessly circulating the balls. In particular, since the ball spline unit is constructed by using a ball chain so that the ball can be smoothly moved even if the curvature radius of the direction changing passage is relatively small, the ball spline unit can be formed in a small size. In addition, the assembling of the balls into the outer cylinder can be easily performed, and the assembling workability is excellent.

What is claimed is:

1. A ball spline unit comprising:

an outer cylinder of which inner periphery is formed with a plurality of loaded ball rolling grooves;

a plurality of unloaded ball passages corresponding to said ball rolling grooves formed to said outer cylinder;

side covers each having a direction changing passage for connecting said loaded ball rolling grooves to said unloaded ball passages, said side covers being provided at both end portions of said outer cylinder;

retainer portions provided along said loaded ball rolling grooves so as to prevent balls in the loaded ball rolling grooves from dropping off;

a spline shaft inserted into said outer cylinder, an outer periphery of said spline shaft being formed with loaded ball rolling grooves corresponding to said loaded ball rolling grooves formed to said outer cylinder; and a number of balls disposed between said outer cylinder and said loaded ball rolling grooves formed to said spline shaft so as to endlessly circulate through said direction changing passages and said unloaded ball passages;

wherein a ball chain comprising a number of spacer portions disposed between the respective balls of a number of balls and connecting portions for connecting the adjacent spacer portions is provided, and wherein at least one of said unloaded ball passage, retainer portions and ball direction changing passage inner peripheral portions is integrally molded with the outer cylinder in accordance with an insert molding method in which the outer cylinder is positioned within a molding die with reference to the loaded ball rolling grooves.

2. A ball spline unit according to claim 1, wherein said unloaded ball passage, said retainer portions and said ball direction changing passage are provided with a guide portion for guiding said ball chain.

3. A ball spline unit comprising:

an outer cylinder of which inner periphery is formed with a plurality of loaded ball rolling grooves;

a plurality of unloaded ball passages corresponding to said ball rolling grooves formed to said outer cylinder;

side covers each having a direction changing passage for connecting said loaded ball rolling grooves to said unloaded ball passages, said side covers being provided at both end portions of said outer cylinder;

a spline shaft inserted into said outer cylinder, an outer periphery of said spline shaft being formed with loaded ball rolling grooves corresponding to said loaded ball rolling grooves formed to said outer cylinder; and a number of balls disposed between said outer cylinder and said loaded ball rolling grooves formed to said spline shaft so as to endlessly circulate through said direction changing passages and said unloaded ball passages;

wherein a ball chain comprising a number of spacer portions disposed between the respective balls of a number of balls and connecting portions for connecting the adjacent spacer portions is provided, and wherein at least one of the unloaded ball passage and ball direction changing passage inner peripheral portions is integrally molded with the outer cylinder in accordance with an insert molding method in which the outer cylinder is positioned within a molding die with reference to the loaded ball rolling grooves.

4. A ball spline unit according to claim 3, wherein said unloaded ball passage and said ball direction changing passage are provided with a guide portion for guiding said ball chain.

5. A ball spline unit according to any one of claims 1, 2, 3 and 4, wherein said ball chain is constructed so that each of the balls is retained by the respective spacer portions provided between the balls.

6. A ball spline unit comprising:
- an outer cylinder of which inner periphery is formed with a plurality of loaded ball rolling grooves;
- a plurality of unloaded ball passages corresponding to said ball rolling grooves formed to said outer cylinder;
- side covers each having a direction changing passage for connecting said loaded ball rolling grooves to said unloaded ball passages, said side covers being provided at both end portions of said outer cylinder;
- retainer portions provided along said loaded ball rolling grooves so as to prevent balls in the loaded ball rolling grooves from dropping off;
- a spline shaft inserted into said outer cylinder, an outer periphery of said spline shaft being formed with loaded ball rolling grooves corresponding to said loaded ball rolling grooves formed to said outer cylinder; and
- a number of balls disposed between said outer cylinder and said loaded ball rolling grooves formed to said spline shaft so as to endlessly circulate through said direction changing passages and said unloaded ball passages;

wherein at least one of said unloaded ball passage, retainer portions and ball direction changing passage inner peripheral portions is integrally molded with the outer cylinder in accordance with an insert molding method in which the outer cylinder is positioned within a molding die with reference to the loaded ball rolling grooves, and said unloaded ball passage, said retainer portions and said ball direction changing passage are provided with a guide portion for guiding said ball chain in which a number of balls are interlinked; and wherein only a number of said balls are attached to said outer cylinder without using a ball chain.

* * * * *